United States Patent [19]

Tanigawa

[11] Patent Number: 4,746,986
[45] Date of Patent: May 24, 1988

[54] MANIFOLD ANALOG/DIGITAL FACSIMILE APPARATUS

[75] Inventor: Toshiaki Tanigawa, Atsugi, Japan

[73] Assignee: Ricoh Company, Ltd., Tokyo, Japan

[21] Appl. No.: 833,258

[22] Filed: Feb. 27, 1986

[30] Foreign Application Priority Data

Mar. 4, 1985 [JP] Japan .................................. 60-41246
Mar. 9, 1985 [JP] Japan .................................. 60-45749

[51] Int. Cl.$^4$ ............................................. H04N 1/00
[52] U.S. Cl. ..................................... 358/256; 358/280
[58] Field of Search ............... 358/256, 260, 293, 294, 358/280

[56] References Cited

U.S. PATENT DOCUMENTS 4,491,873  1/1985  Takayama ........................... 358/256
4,583,124  4/1986  Tsuji ..................................... 358/256
4,611,246  9/1986  Nihei .................................... 358/256

Primary Examiner—Michael A. Masinick
Attorney, Agent, or Firm—Oblon, Fisher, Spivak, McClelland & Maier

[57] ABSTRACT

A manifold facsmile apparatus capable of selectively communication with a G3 analog facsimile apparatus and a G4 digital facsimile apparatus. The manifold apparatus includes an analog interface adapted for connection with an analog communication network and a digital interface adapted for connection with a digital communication network. The two interfaces are selectively connected to a communication control unit so that the apparatus is connectable to the analog network or the digital network. When called at the same time over the analog and the digital networks, the control unit gives priority to the digital network, Further, the control unit is capable of selectively performing data link control necessary for communication with the G3 analog terminal and data link control necessary for communication with the G4 digital terminal. The control unit is allowed to enter into G4 digital facsimile data link contol within a predetermined period of time after the generation of a call and, upon the lapse of that period of time, starts on G3 analog facsimile data link control, thereby performing either one of the two data link controls,. That particular period of time is short enough to prevent timer overflow in a G3 analog terminal.

7 Claims, 4 Drawing Sheets

MANIFOLD ANALOG/DIGITAL FACSIMILE APPARATUS

BACKGROUND OF THE INVENTION

1. Field of the Invention

The present invention relates to a manifold facsimile apparatus capable of selectively communicating with a G3 (Group 3) facsimile terminal as prescribed by CCITT (Consultation Committee of International Telegraph and Telephone), i.e., an analog facsimile terminal using a public telephone network, and a G4 (Group 4) digital facsimile apparatus standard functions of which will be prescribed by CCITT in the near future.

2. Discussion of Background

A facsimile apparatus designed for visual communication has been remarkably scaled up in function to even acieve a capability for transmitting a standard document of A4 format within less than one minute. CCITT has recommended basic functions of facsimile transceivers and standardized the specifications, data link controls and others associated with the same. To date, Recommendations T.2, T.3, T.4 and T.30 are available for G1 (Group 1) to G3 (Group 3) transceivers all of which are analog transceivers using analog communication networks, e.g. a public telephone network.

Further, CCITT is now preparing a recommendation which prescribes the specification, data link control and other standard functions of a G4 facsimile apparatus, which is an advanced version of a G3 apparatus. A G4 facsimile apparatus is expected to feature high resolution and use a system which is higher in compression efficiency than the others. Such an apparatus, therefore, allows visual communication to be accomplished with quality superior to that of a G3 apparatus. Basically, a G4 apparatus is a digital facsimile apparatus which uses a digital network for communication and, for this reason, it has a data link control function capable of sufficiently utilizing the advanced communication function of a digital network. Digital switched networks, packet networks and other digital communication networks have recently been constructed and are deemed to become open to the public soon. Such a trend is accelerating the development of a digital facsimile transceiver which uses a digital communication network.

In the above situation, there arises a need for mutual communication between a traditional G3 analog facsimile apparatus and a G4 digital facsimile apparatus which will become predominant in the future. However, since an analog facsimile apparatus and a digital facsimile apparatus are incapable of communicating with each other due to the different kinds of networks they use, digital apparatuses which will be installed cannot be connected to a facsimile communication path which is implemented with existing analog apparatuses.

SUMMARY OF THE INVENTION

It is therefore an object of the present invention to provide a manifold facsimile apparatus capable of selectively communicating with both a G3 analog apparatus and a G4 digital apparatus.

It is another object of the present invention to provide a manifold facsimile apparatus selectively connectable to both a public telephone network or like analog communication network and a digital switched network, packet network or like digital communication network.

It is another object of the present invention to provide a manifold facsimile apparatus which allows a G3 analog apparatus and a G4 digital apparatus to hold communication over a public telephone network.

In one aspect of the present invention, there is provided a manifold facsimile apparatus capable of selectively communicating with an analog facsimile apparatus which uses an analog communication network and a digital facsimile apparatus which uses a digital communication network. The apparatus comprises a digital interface circuit for connecting the apparatus to the digital network, a communication control circuit for selectively performing digital data link control and analog data link control, and a selector for connecting one of the digital and analog interface circuits to the communication control circuit. The communication control circuit is constructed to select by the selector means one of the digital and analog interface circuits which is called prior to the other to enter into a reception control procedure which matches to the selection while holding the interface circuit which is not called in a busy state, and to select the digital interface circuit when called by the digital interface circuit and the analog interface circuit at the same time.

In another aspect of the present invention, there is provided a manifold facsimile apparatus capable of selectively communicating with an analog facsimile apparatus and a digital facsimile apparatus over a single communication path. The apparatus comprises a communication control unit capable of selectively performing first data link control adapted for communication with the digital facsimile apparatus and second data link control adapted for communication with the analog facsimile apparatus. The communication control unit is constructed to be allowed to enter into the first data link control before a predetermined period of time expires after generation of a call and, upon the lapse of that period of time, to enter into the second data link control only.

The above and other objects, features and advantages of the present invention will become more apparent from the following detailed description taken with the accompanying drawings.

BRIEF DESCRIPTION OF THE DRAWINGS

FIG. 4 is a block diagram showing a second embodiment of the present invention;

DESCRIPTION OF THE PREFERRED EMBODIMENTS

While the manifold analog/digital facsimile apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
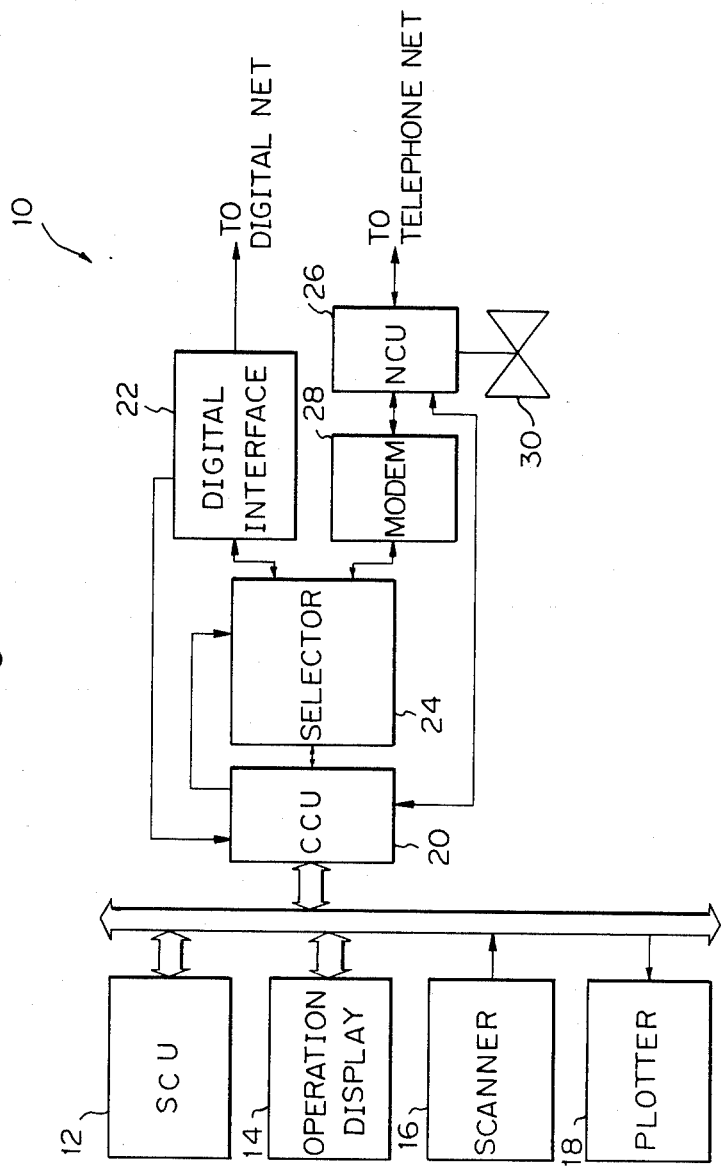
FIG. 1 is a block diagram showing a first embodiment of the present invention.

Referring to FIG. 1 of the drawings, a manifold facsimile apparatus of the present invention is shown and generally designated by the reference numeral 10. The apparatus 10 includes a system control unit (SCU) 12 which serves to control the whole apparatus and comprises a microcomputer and various peripheral circuits associated therewith. An operation/display section 14 is made up of various keys which the operator may manipulate to operate the apparatus 10 and a display for displaying messages which may be presented by the apparatus 10. A scanner 16 functions to read a picture to be transmitted with predetermined resolution, while a plotter 18 functions to produce a hard copy which carries a received picture.

A communication control unit (CCU) 20 is capable of selectively performing data link control which uses a digital network and data link control which uses an analog network, i.e. public telephone network. The CCU 20 is implemented by a microcomputer and peripheral circuit associated therewith. A digital interface 22 fulfills the role of physically connecting the CCU 20 to a digital network such as DDX-P or like packet network or digital switched network. Connected to one switching terminal of a switch 24, the digital interface 22 informs the CCU 20 of reception of a call from the digital network. A network control unit (NCU) 26 is adapted to physically connect the CCU 20 to a telephone network. Connected to the other switching terminal of the switch 24 via a modem 28, the NCU 26 directly interacts with the CCU 20 when a call is placed or received. Usually, a telephone 30 is connected with the NCU 26. The switch 24 is controlled by the CCU 20.

Figure 2:
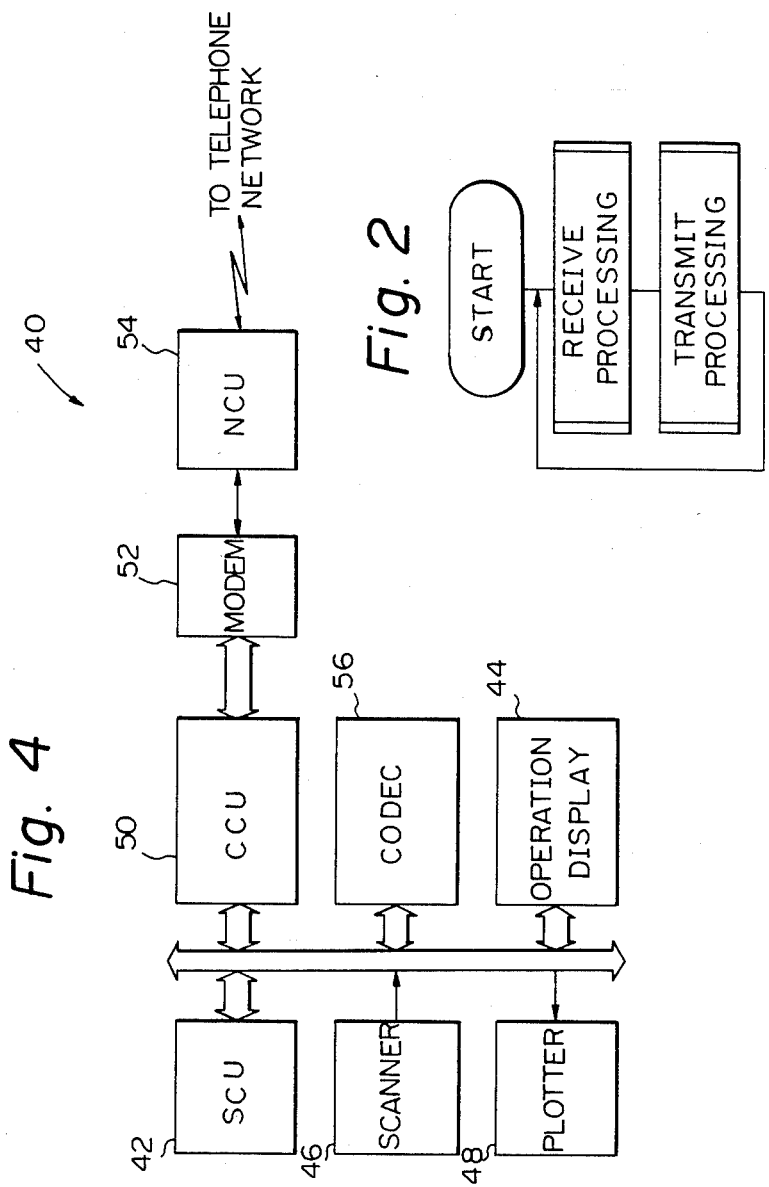
FIG. 2 is a flowchart representative of processing which a communication control unit shown in FIG. 1 performs.

Referring to FIG. 2, the processing which the CCU 20 performs is outlined. As shown, the CCU 20 usually repeats a control loop consisting of receive processing and transmit processing. Specifically, it enters into receive processing when a call meant for the apparatus 10 is placed in the digital network or the telephone network and into the transmit processing when the SCU 12 generates a transmission request.

Figure 3:
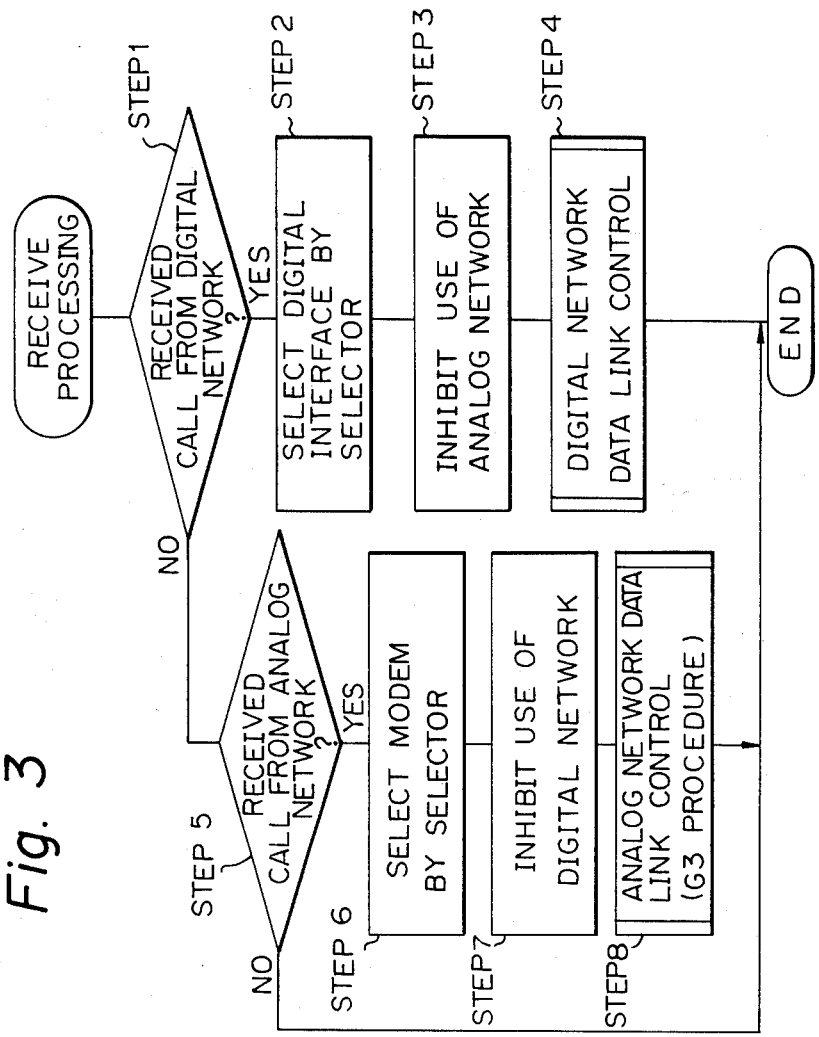
FIG. 3 is a flowchart demonstrating exemplary receive processing.

Referring to FIG. 3, there is shown an exemplary receive processing flow. First, the CCU 20 determines whether a call has been received from the digital network (STEP 1). If the result is YES, meaning that a call has been received, the CCU 20 operates the selector 24 to select the digital interface 22 (STEP 2) and, at the same time, delivers an inhibit signal to the NCU 26 to reject a call which may arrive over the telephone network (STEP 3). After setting up the connection between the apparatus 10 and the digital network, the CCU 20 start on data link control for digital network (STEP 4). The data link control for digital network is the same as the G3 procedure except for the link level and the transport level.

Meanwhile, if the result of the STEP 1 is NO, the CCU 20 decides whether a call has been received from the telephone network (STEP 5). If the result is NO, the CCU 20 immediately returns determining that a call meant for the apparatus 10 has not been placed on any of the two networks. If the result of the STEP 5 is YES, meaning that a call has been placed on the telephone network, the CCU 20 causes the selector 24 to select the modem 28 and the NCU 26 and, at the same time, delivers an inhibit signal to the digital interface 22 to reject a call from the digital network (STEP 7). After completing the connection of the apparatus to the telephone (analog) network, the CCU 20 enters into data link control for telephone network, i.e. G3 procedure (STEP 8).

As described above, in this particular embodiment, priority is given to digital network data transmission over the analog or telephone network data transmission so that data transmission over the digital or the analog network may be freed from conflicts.

Received data, on the other hand, are transferred from the CCU 20 to the SCU 12. The SCU 12 applies a sequence of operations such as decoding to the received data to restore them to original video signals. The plotter 18 to which the video signals are applied prints out a received picture associated with the video signals.

During transmit processing, as the operator enters an address of a desired remote terminal by manipulating the operation/display section 14, the SCU 12 transfers it to the CCU 20. The CCU 20 controls the selector 24 according to the entered address, then calls the address, and then sequentially transmits to the address the data which are transferred thereto from the SCU 12. Here, the data to be transmitted are prepared by the SCU 12 by applying coding and other operations to video signals which are read by the scanner 16.

It will be seen that in accordance with the illustrative embodiment a facsimile apparatus with a capability for selectively communicating with an analog facsimile apparatus and a digital facsimile apparatus is provided. This advantage is derived from the installation of an analog and a digital interfaces adapted for connection with an analog and a digital networks, respectively, and selectively connected to a transmission control unit; when calls meant for the manifold facsimile apparatus are placed at the same time on the analog and the digital networks, priority is given to the digital network over the analog network.

Referring to FIG. 4, a second embodiment of the present invention is shown. In this particular embodiment, the facsimile apparatus, generally 40, is furnished with a capability for selectively communicating with a G3 analog facsimile transceiver and a G4 digital facsimile tranceiver using a telephone network. As shown, an SCU 42 serves to control the whole facsimile apparatus 40 and comprises a microcomputer and peripheral circuits associated therewith. An operation/display section 44 is made up of various keys which the operator may manipulate to operate the apparatus 40 and a display for displaying messages which the apparatus 40 may show the operator. A scanner 46 functions to read a picture to be transmitted with predetermined resolution, while a plotter 48 functions to produce a hard copy which carries a received picture.

A CCU 50 is capable of performing both data link control associated with a G4 facsimile transceiver and data link control associated with a G3 facsimile transceiver. The CCU 50, too, comprises a microcomputer and peripheral circuits associated therewith. A modem 52 functions to modulate by a predetermined modulation system transmit signals (coded as will be described) and to demodulate received signals to original ones. The modem 52 is connected to a telephone network via an NCU 54 which is adapted to physically connect the apparatus 40 to the telephone network. A coder/decoder, or codec, 56 is adapted to compress video signals outputted by the scanner 46 to code them and to expand received signals to decode them to original ones. The codec 56 is capable of selectively performing coding designed for a G3 facsimile transceiver and that designed for a G4 facsimile transceiver.

During transmission of picture data, address data entered through the operation and display section 44 is transferred from the SCU 42 to the CCU 50 and therefrom to the NCU 54 to be delivered to the telephone network, thereby calling the destination. After the communication has been set up by such a procedure, the CCU 50 sends a picture data read request to the system control 42. In response, the system control 42 activates the scanner 46 to produce picture signals associated with the picture data. The picture signals are routed by the SCU 42 to the codec 56 which then compresses the input video signals, the coded signals being fed to the CCU 50. The CCU 50 applies the input signals to the modem 52 so that the signals are modulated and then sent out to the desired remote terminal via the NCU 54.

Meanwhile, when the apparatus 40 is called by a remote terminal, the CCU 50 receives signals according to a predetermined data link control procedure and transfers the received signals to the SCU 42. The SCU 42 applies the input signals to the codec 56 which then decodes them to original picture signals. These picture signals are transferred to the plotter 48 to be prined out as a picture.

Now, where the manifold facsimile apparatus 40 is used to transmit picture data, it is necessary to decide which one of the G3 facsimile data link control and G4 facsimile data link control is to be used at the beginning of transmission. While the operator uses the apparatus 40 as a transmit terminal, he or she is expected to be well informed of the particular type of a desired remote terminal beforehand, i.e. G3 or G4. Hence, the operator may enter function data associated with the desired terminal by means of the keys and the like of the operation/display section 44, thereby causing the SCU 42 to notify the CCU 50 of the function. On the other hand, where the facsimile apparatus 40 serves as a receive terminal, data link control which matches to a transmit terminal cannot be performed unless the apparatus 40 itself knows whether the transmit terminal is a G3 transceiver or a G4 transceiver based on a data link control signal from the transmit terminal.

In the illustrative embodiment, the above requirement is met by programming the procedure which occurs at the beginning of communication such that the apparatus 40 can enter into the G4 facsimile data link control only before a predetermined period of time expires after a call has been placed and, thereafter, it enters into the G3 facsimile data link control only.

Figure 5:
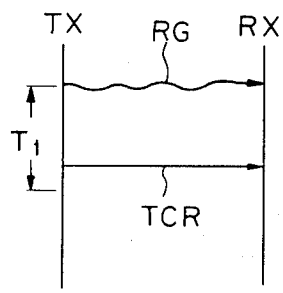
FIG. 5 is a timing chart representative of a period of time associated with data link control for communication with a G4 facsimile terminal.
Figure 6:
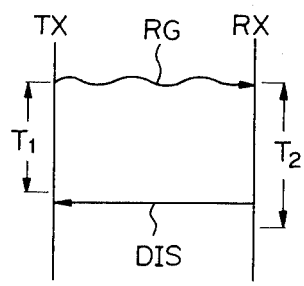
FIG. 6 is a timing chart representative of a data link control for communication with a G3 facsimile terminal.

Specifically, in the case where the apparatus 40 functions as a transmit terminal and the receive terminal is a G4 facsimile terminal, it sends a transport connection request signal TCR (see FIG. 5) to the receive terminal before a period of time $T_1$ elapses after the generation of a call so as to perform the G4 facsimile data link control. Where the receive terminal is a G3 facsimile terminal, the transmit terminal 40 enters into the G3 facsimile data link control at the instant of generation of a call and, then, awaits a return of a digital identification signal DIS (see FIG. 6) from the receive station. Since it is prescribed that the G3 facsimile data link control returns a digital identification signal DIS within a predetermined period of time $T_2$ after being called, the transmit terminal 40 continuously awaits the return of a digital identification signal DIS until the time $T_2$ expires (see FIG. 6).

Next, assume that the facsimile apparatus 40 serves as a receive terminal under the above conditions. When the receive terminal 40 has not received a transport connection request signal TCR before the time $T_1$ has expired after a call meant therefor, it may decide that the transmit terminal is a G3 facsimile terminal; when the receive terminal 40 has received a transport connection request signal TCR within the time $T_1$ after a call meant therefor, it may decide that the transmit terminal is a G4 facsimile terminal. Hence, data link control which the receive terminal 40 has to perform can be set up.

Since the time $T_2$ is $30 \pm 5$ seconds according to the G3 facsimile data control, a period of time which is not longer than the time $T_2$, i.e., shorter than 30 seconds may be selected for the time $T_1$.

In this manner, the facsimile apparatus 40 is capable of communicating with both of a G3 and a G4 facsimile terminals without resorting to any modification of the existing G3 facsimile data link control.

It will be seen that the facsimile apparatus 40 in this particular embodiment is capable of communicating with a G3 and a G4 facsimile terminals as desired. This advantage is derived from communication control means which can selectively perform data link control which is necessary for communication with a G3 terminal and data link control necessary for communication with a G4 terminal; a predetermined period of time after the generation of a call is provided as a duration in which the apparatus 40 can enter into the G4 facsimile data link control and, upon the lapse of the above period of time, the apparatus 40 enters into the G3 facsimile data link control.

Various modifications will become possible for those skilled in the art after receiving the teachings of the present disclosure without departing from the scope thereof.

What is claimed is:

1. A manifold facsimile apparatus capable of selectively communicating with an analog facsimile apparatus which uses an analog communication network and a digital facsimile apparatus which uses a digital communication network, comprising:
   digital interface means for connecting the apparatus to the digital network;
   analog interface means for connecting the apparatus to the analog network;
   communication control means for selectively performing digital data link control and analog data link control; and
   selector means for connecting one of said digital interface means and said analog interface means to said communication control means;
   said communication control means being constructed to select by said selector means one of said digital interface means and said analog interface means which is called prior to the other to enter into a reception control procedure which matches to the selection while holding the interface means which is not called in a busy state, and to select said digital interface means when called by said digital interface means and said analog interface means at the same time.

2. A manifold facsimile apparatus as claimed in claim 1, wherein the analog facsimile apparatus comprises a G3 facsimile apparatus as prescribed by CCITT Recommendations.

3. A manifold facsimile apparatus as claimed in claim 1, wherein said analog interface means comprises network control means connected between the analog communication network and said selector means.

4. A manifold facsimile apparatus as claimed in claim 3, further comprising a modem connected between said network control means and said selector means.

5. A manifold facsimile apparatus capable of selectively communicating with an analog facsimile apparatus and a digital facsimile apparatus over a single communication path, comprising a communication control unit capable of selectively performing first data link control adapted for communication with the digital facsimile apparatus and second data link control adapted for communication with the analog facsimile apparatus, said communication control unit being constructed to be allowed to enter into said first data link control before a predetermined period of time expires after generation of a call and, upon lapse of said period of time, to enter into said second data link control only.

6. A manifold facsimile apparatus as claimed in claim 5, wherein the analog facsimile apparatus comprises a G3 facsimile apparatus as prescribed by CCITT Recommendations, while the digital facsimile apparatus comprises a G4 facsimile apparatus.

7. A manifold facsimile apparatus as claimed in claim 5, wherein the communication path comprises a telephone network.

* * * * *